(12) United States Patent
Blackburn et al.

(10) Patent No.: US 8,177,632 B2
(45) Date of Patent: May 15, 2012

(54) INFORMATION FLOW CONTROL FOR GAMING MACHINES REQUIRING SERVER SUPPORT

(75) Inventors: Christopher W. Blackburn, Reno, NV (US); Robert T. Davis, Carson City, NV (US); Christopher J. Frattinger, Sparks, NV (US); Suzanne J. Ruebusch, Cincinnati, OH (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 697 days.

(21) Appl. No.: 12/084,598

(22) PCT Filed: Aug. 25, 2006

(86) PCT No.: PCT/US2006/033295
§ 371 (c)(1),
(2), (4) Date: May 6, 2008

(87) PCT Pub. No.: WO2007/055774
PCT Pub. Date: May 18, 2007

(65) Prior Publication Data
US 2010/0035690 A1    Feb. 11, 2010

(51) Int. Cl.
*A63F 9/24* (2006.01)
(52) U.S. Cl. ............... 463/25; 463/29; 463/42
(58) Field of Classification Search .......... 463/25, 463/29, 42
See application file for complete search history.

(56) References Cited

U.S. PATENT DOCUMENTS

| | | | |
|---|---|---|---|
| 6,675,212 B1 | 1/2004 | Greenwood | |
| 6,811,488 B2 * | 11/2004 | Paravia et al. | 463/42 |
| 7,286,834 B2 * | 10/2007 | Walter | 455/456.1 |
| 2002/0147049 A1 * | 10/2002 | Carter, Sr. | 463/42 |
| 2005/0197190 A1 * | 9/2005 | Amaitis et al. | 463/42 |
| 2006/0035707 A1 * | 2/2006 | Nguyen et al. | 463/29 |
| 2006/0068914 A1 * | 3/2006 | Barton | 463/42 |
| 2006/0270421 A1 * | 11/2006 | Phillips et al. | 455/457 |
| 2007/0060306 A1 * | 3/2007 | Amaitis et al. | 463/25 |
| 2007/0060355 A1 * | 3/2007 | Amaitis et al. | 463/40 |

FOREIGN PATENT DOCUMENTS

| | | |
|---|---|---|
| EP | 0993165 A | 4/2000 |
| GB | 2330502 | 4/1999 |
| WO | WO 2007055774 | 5/2007 |

OTHER PUBLICATIONS

Garrett, Jesse James, "Ajax: A New Approach to Web Applications", Adaptive Path.com, pp. 1-5, http://web.archive.org/web/20050222032831/http://www.adaptivepath.com/publications/essays/archives/000385.php.

Alessandro Alinone, "Lightstreamer; White Paper",Internet, Jun. 5, 2006, pp. 1-33, http://www.lightstreamer.com/lightstreamer_WhitePaper.pdf.

(Continued)

*Primary Examiner* — Peter DungBa Vo
*Assistant Examiner* — Steve Rowland
(74) *Attorney, Agent, or Firm* — Nixon Peabody LLP

(57) ABSTRACT

A computing apparatus operating as a gaming machine permits wagering on games. A browser generates a request for information contained on a remote server. An intermediate client-side processing, ICSP, engine coupled with the browser receives the request and generates a corresponding request that is transmitted to the remote server. The browser, following the transmission of the first message, being released to process other actions without having yet received a reply to the first message.

23 Claims, 6 Drawing Sheets

OTHER PUBLICATIONS

Alex Russell, "Comet:Low Latency Data from the Browser", Internet, Mar. 3, 2006, pp. 103, http://alex.dojotoolkit.org/?p=545.
Garrett, JJ, "Ajax:A New Approach to Web Applications", Internet, Feb. 18, 2005, pp. 2-4, http://alice.loria.fr/publications/papers/2004/ray_tracing_gpu/gpu_ac.

Dr. Rohit Khare, "Beyond AJAX:Accelerating Web Applications with Real-time Event Notifications", internet, Aug. 2005, pp. 1-10, http://web.archive/org/web/20051213013427/http:www.knownow.com/products/docs/whitepapers/KN-Beyond-AJAX.pdf.

* cited by examiner

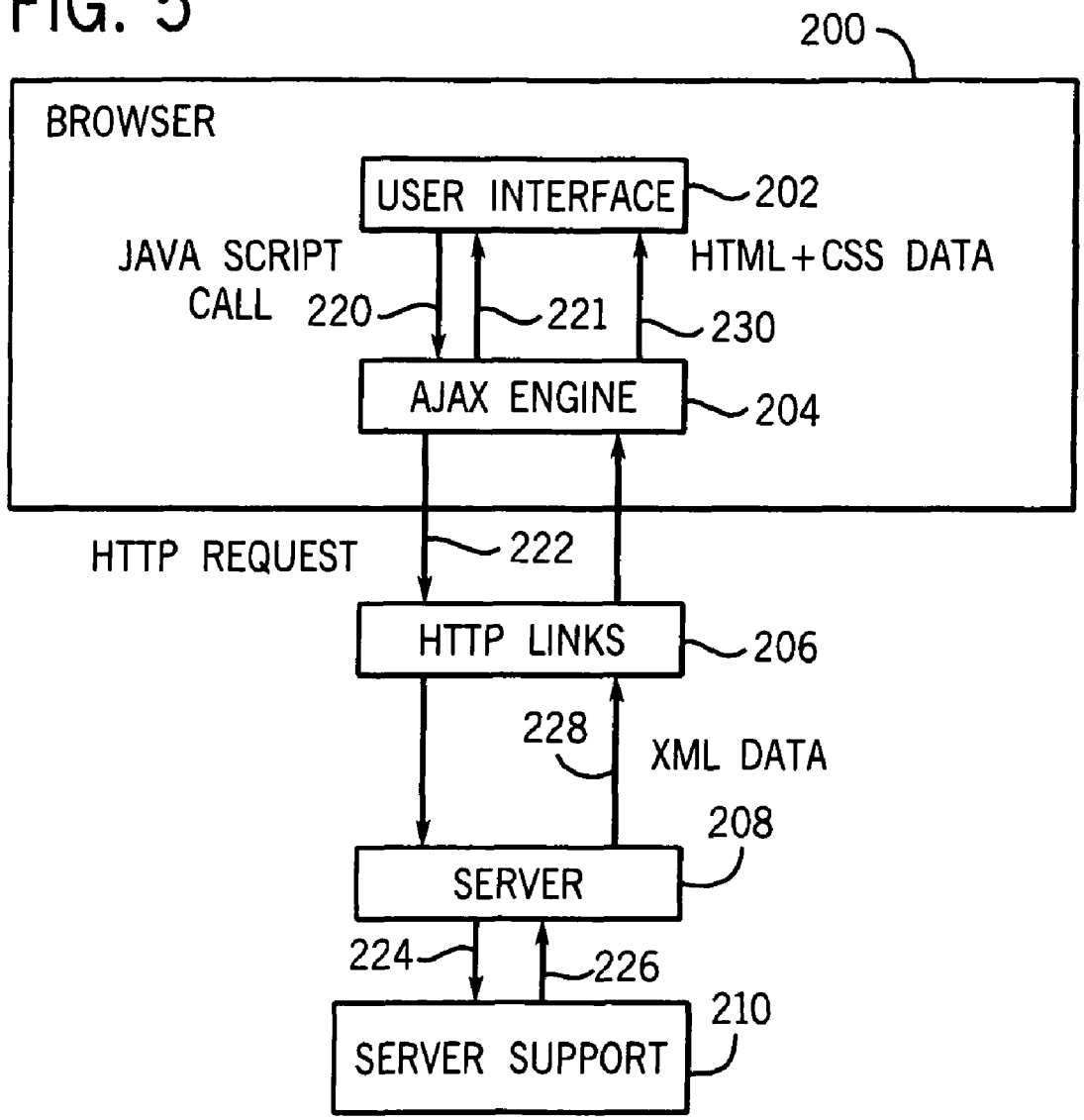

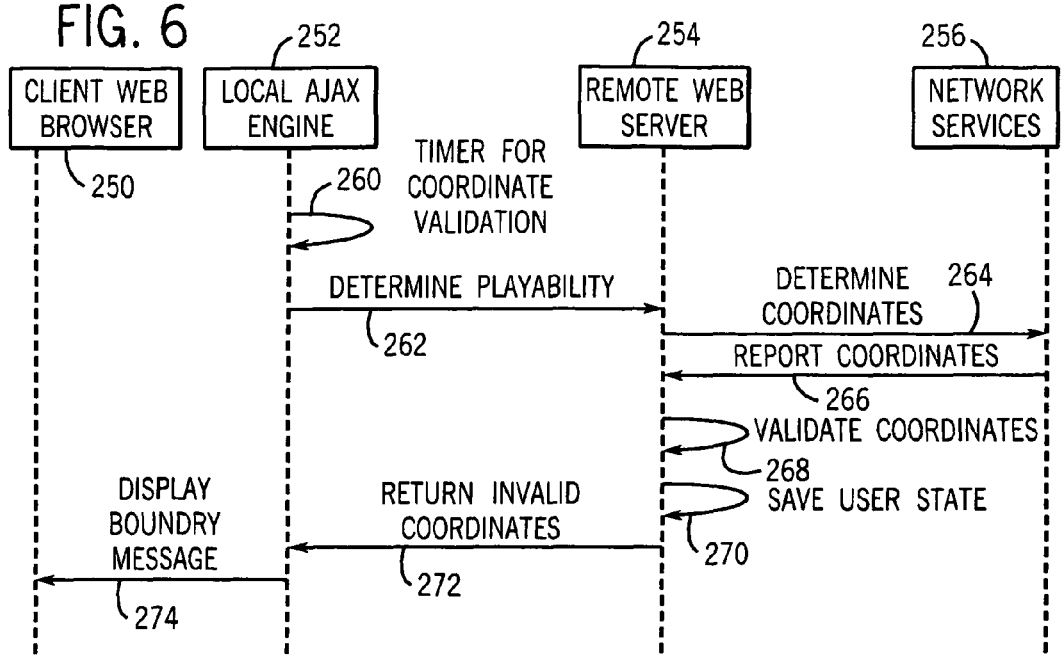
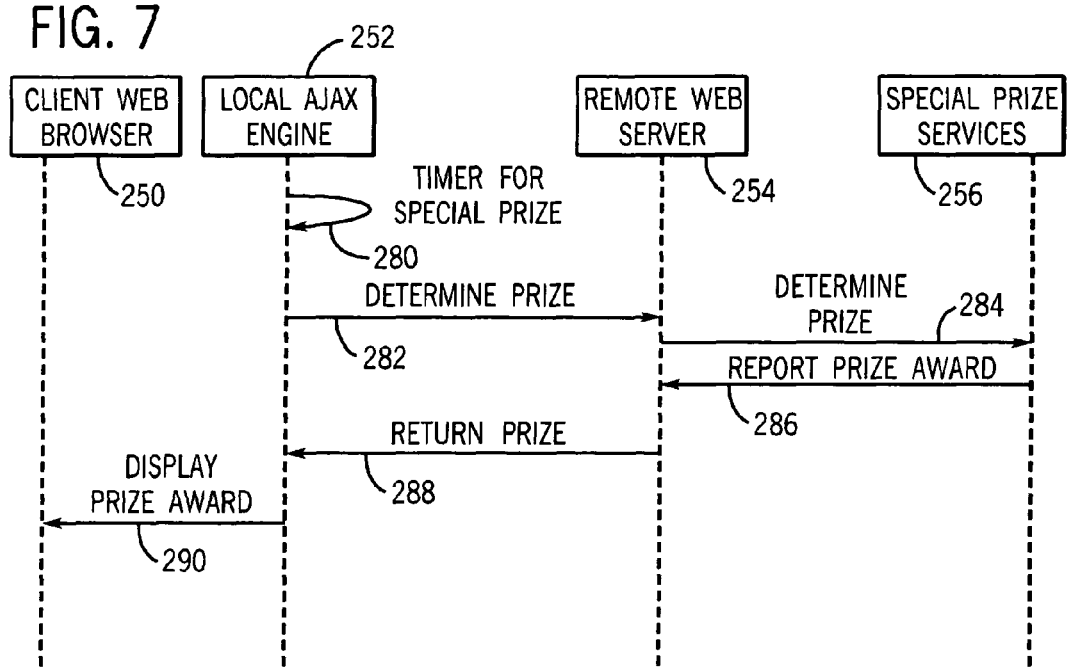

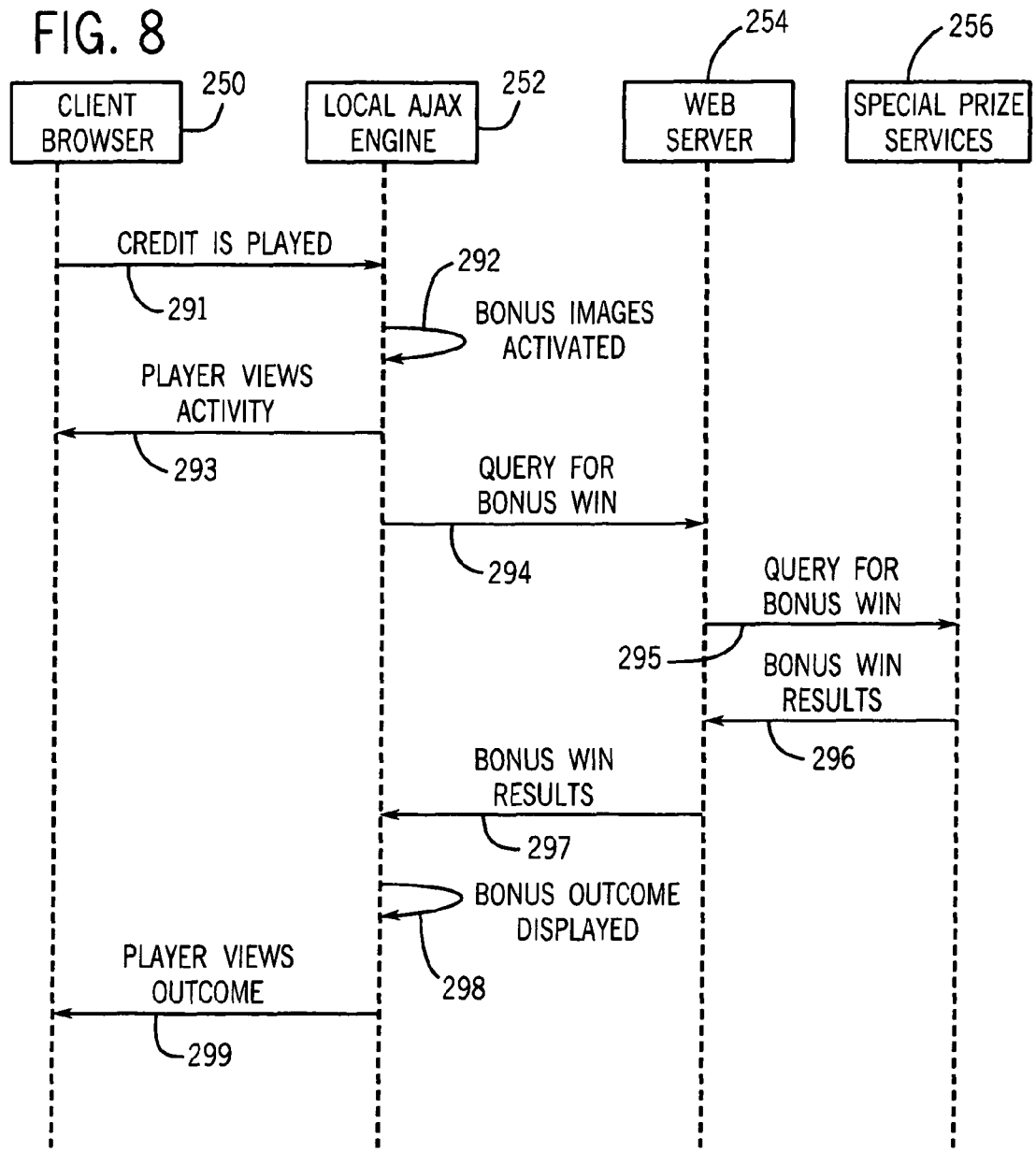

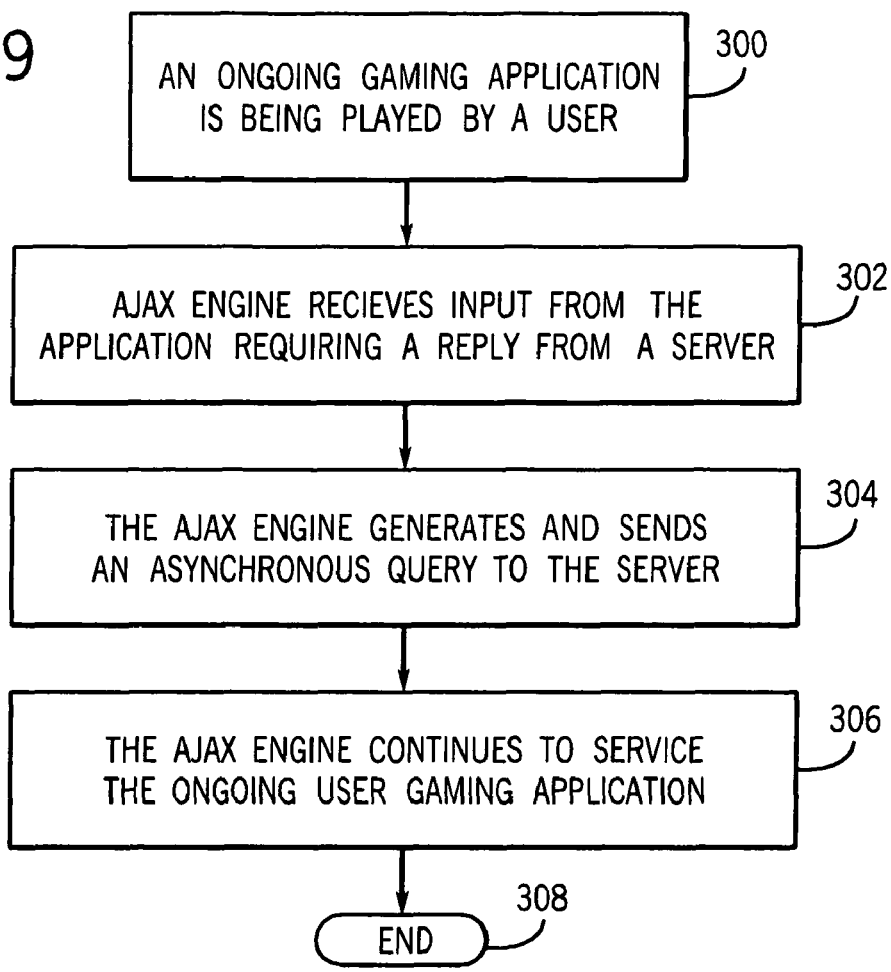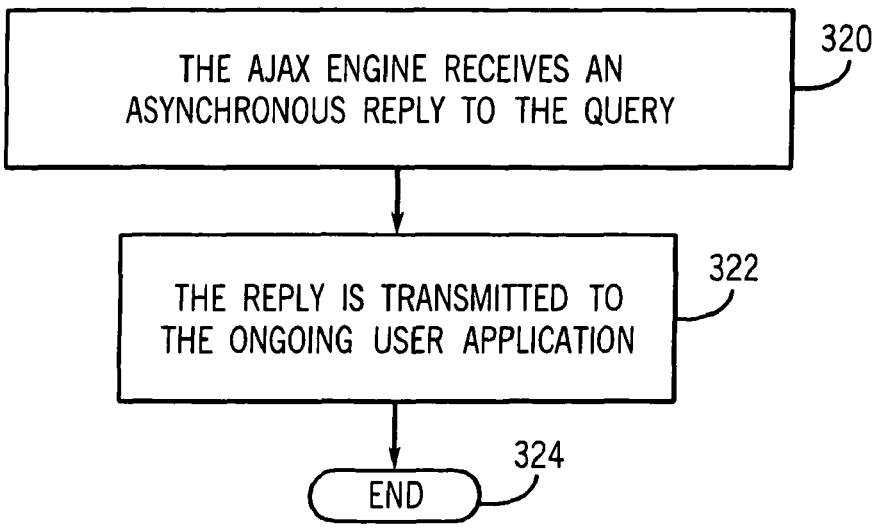

INFORMATION FLOW CONTROL FOR GAMING MACHINES REQUIRING SERVER SUPPORT

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to communications to and from gaming machines that support wagering on wagering games, and more particularly to the flow of information between gaming machines and remote servers that support the gaming machines.

BACKGROUND OF THE INVENTION

Gaming machines, such as slot machines and video poker machines, have been a cornerstone of the gaming industry for several years. Generally, the popularity of such machines with players is dependent on the likelihood (or perceived likelihood) of winning money at the machine and the intrinsic entertainment value of the machine relative to other available gaming options. Different players, changing popularity of types of games, geographic location of a gaming machine, time of day and day of the week may cause players to be attracted to different types of gaming machines. This gives rise to a desire by operators for gaming machines that are flexible and configurable.

Microprocessor-based gaming machines that follow a client/server configuration provide flexibility through software control and the ability to communicate data and download software from a supporting server. The gaming machines are clients of one or more remotely located servers. While the gaming machines will typically contain a gaming application, i.e. game software currently in play by a user, other data or management control (gaming information) related to the current gaming application or the gaming machine may need to be obtained from a remote server.

Where the ongoing play of the current game is dependent on the gaming machine receiving such gaming information from the server, the inherent delay in gaming machine obtaining the information from the server will be a disruption to the user if the delay is long enough. For example, a delay of 0.01 second in the ongoing game would not likely be noticed, but a delay of a few seconds in a continuously changing image would likely be annoying to the user. Delays are commonly encountered when a browser initiates an information request from a remote server. The typical browser will delay other processing until the information has been received, i.e. an hourglass being commonly displayed on the screen to indicate the browser is awaiting a reply or event. Therefore, there is a need to minimize such disruptions for gaming machines operating as clients in the client/server mode.

SUMMARY OF THE INVENTION

According to one aspect of the present invention, an embodiment includes a computing apparatus operating as a gaming machine that permits wagering on games. A browser generates a request for information contained on a remote server. An intermediate client-side processing, ICSP, engine coupled with the browser receives the request and generates a corresponding request that is transmitted to the remote server. The browser, following the transmission of the first message, is released to process other actions without having yet received a reply to the first message.

According to another aspect of the invention, an embodiment includes a communication method implemented by a computing apparatus operating as a gaming machine that permits wagering on games. A first message is received from a browser residing on the computing apparatus by an intermediate client-side processing, ICSP, engine also residing on the computing apparatus, where the first message is a request for information contained on a remote server. A second message is generated by the ICSP engine responsive to receipt of the first message and transmitted to the remote server, where the second message seeks the information from the remote server. The browser, following the transmission of the first message to the ICSP engine, is released to continue processing other tasks without having received the reply from the remote server responding to the request by the browser.

According to yet another aspect of the invention, a computer readable storage medium is encoded with instructions for enabling a computing apparatus to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

BRIEF DESCRIPTION OF THE DRAWINGS

FIG. 5 is a functional block diagram illustrating client/server communications in accordance with an embodiment of the present invention.

FIG. 6 is a first exemplary signal flow diagram in accordance with an embodiment of the present invention.

FIG. 7 is a second exemplary signal flow diagram in accordance with an embodiment of the present invention.

FIG. 8 is a third exemplary signal flow diagram in accordance with an embodiment of the present invention.

FIG. 9 shows exemplary steps taken by the user's client computing apparatus to obtain information from a server in accordance with an embodiment of the present invention.

FIG. 10 shows exemplary steps taken by the user's client computing apparatus and receiving requested information from a server in accordance with the embodiment of the present invention.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
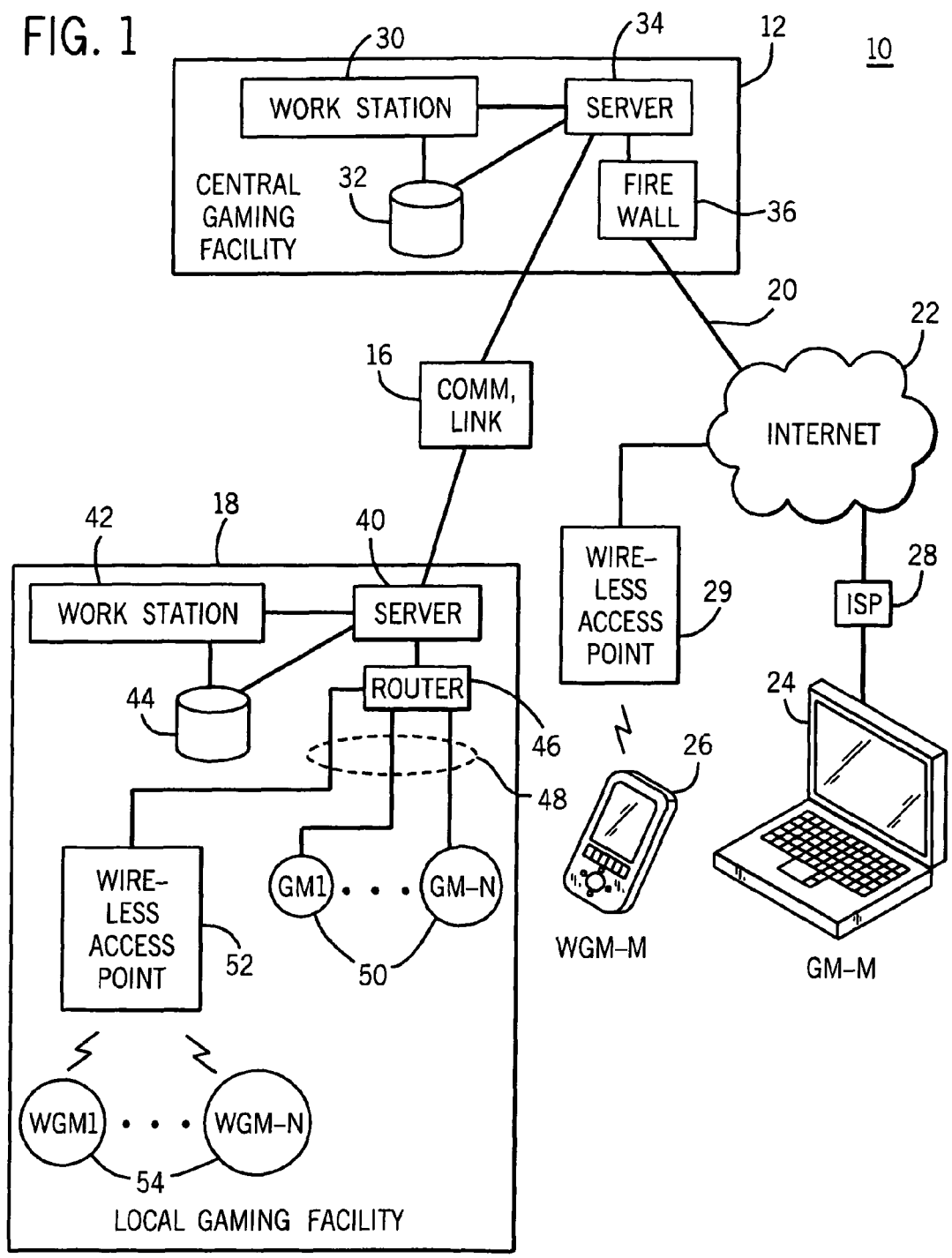
FIG. 1 is a block diagram of the gaming system embodying the present invention.

Referring to FIG. 1, an exemplary gaming system 10 includes a central gaming facility 12 connected by communication link 16 to a local gaming facility 18, e.g. a casino, and by link 20 with the internet 22. End user computing devices including a gaming machine GM-M 24, e.g. a laptop computer, and wireless gaming machine WGM-M 26, e.g. a personal digital assistant (PDA), function as clients of the central gaming facility 12. Laptop 24 is coupled via internet service provider 28 and the internet 22 with the central gaming facility 12. The PDA 26 is connected with a wireless link by the wireless access point 29 and internet 22 to the central gaming facility 12. As used herein, "gaming" refers to the use of various games that support the placing of wagers on the outcome of the games, e.g. a video poker machine.

The central gaming facility 12 may represent a control location of a gaming business operator that supports individual gaming users, e.g. users of PDA 26 and laptop 24, as well as other gaming facilities of the operator such as casino 18. The central gaming facility 12 in this illustrative example is geographically separated from the casino 18 and the individual users. The central gaming facility 12 includes a workstation 30 supported by data storage element 32 and a server 34 that serves as a communication host for casino 18 and the individual users via firewall 36. Requests for information and/or data received from the individual users by server 34 are processed, the requested information and/or data obtained from support resources, e.g. workstation 30 and data residing in storage element 32, and replies with the requested information sent from the server 34 to the requesting user's devices.

The local gaming facility 18 represents a casino and includes a server 40 supported by a workstation 42, data storage element 44 and a router 46. The router 46 supports communications with different gaming machines GM(1)-GM(N) 50 by wired links 48. A wireless access point 52 is connected by a wired link 48 to router 46 and by wireless communication links to wireless gaming machines WGM(1)-WGM(N) 54.

At least some of the gaming machines 50 and some of the wireless gaming machines 54 support the play of wagering games in which the user's gaming machine functions in the client/server communication model with the user's gaming machine being a client of server 40. The user's gaming machine contains software which is responsible for the ongoing play of the game. However, some information or data associated with the play of the game must be obtained during the ongoing play of the game from server 40. Consistent with one objective of the embodiments of the present invention, disruptions to the ongoing play of the game from the perspective of the user due to delays in obtaining such information are minimized, if not eliminated, by the use of a communication engine operating on the user's gaming machine.

Figure 2:
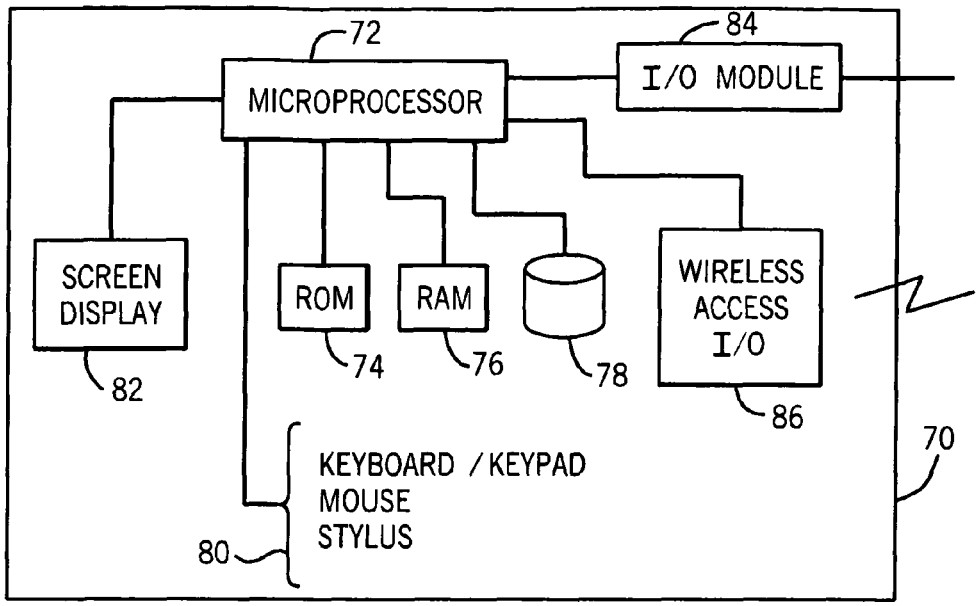
FIG. 2 is a block diagram of a representative computing apparatus.

FIG. 2 is a representative computing apparatus 70 for a user's gaming machine. It is also applicable as architecture for the workstations and servers of FIG. 1. A microprocessor 72 performs processes and tasks based on stored program instructions. It is supported by read-only memory (ROM) 74, random access memory (RAM) 76 and nonvolatile data storage device 78. As will be understood by those skilled in the art, data and stored program instructions in ROM 74 is typically utilized by microprocessor 72 to initialize and boot the computing apparatus. An application program, e.g. a wagering game, is stored in storage element 78 or downloaded from the supporting server. At least active portions of the application program will be typically stored in RAM 76 for ready access and processing by microprocessor 72. A variety of user inputs 80 such as a keyboard, keypad, mouse, stylus, and joystick can be utilized to input data such as to control objects or events during the play of a game. A display screen 82 provides a visual output for the user, e.g. images that change with the play of a game. An input/output (I/O) module 84 provides a communication interface permitting microprocessor 72 to transmit and receive data with external nodes. Similarly, wireless access I/O module 86 provides a communication interface permitting microprocessor 72 to transmit and receive data wirelessly with external nodes capable of compatible wireless communications. A gaming machine 70 that supports a game operating in a client/server communication model will utilize at least one of modules 84 and 86, and may contain both to enhance communication flexibility.

Figure 3:
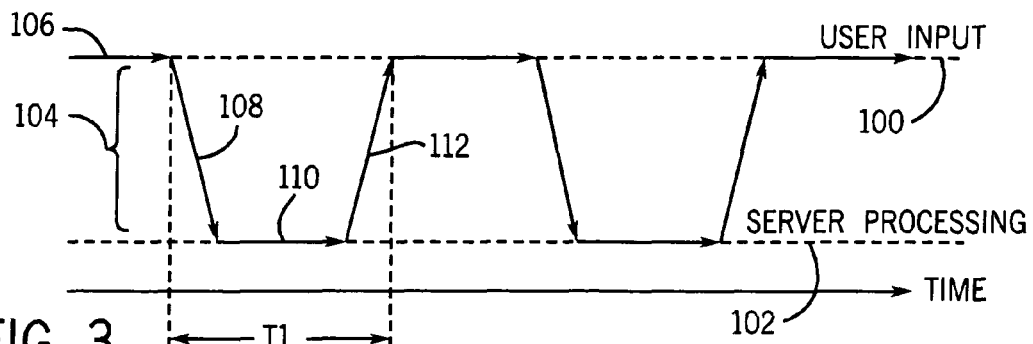
FIG. 3 is a signal flow diagram of prior art client/server communications.

FIG. 3 represents a known web application such as a hypertext transfer protocol (HTTP) request for information from a server generated by a client browser. Line 100 represents the user input at the client browser such as operating on the user's personal computer. Line 102 represents the server and supporting peripherals. The arrows 104 between lines 100 and 102 represent data transmissions and the associated delay of such transmissions. As indicated in the drawing, time is increasing from left to right. As used herein a browser, e.g. client browser, is software capable of transmitting and receiving http/https information over a network. One example of a browser is Microsoft's Internet Explorer.

In a typical implementation, the user generates an input 106 causing the user's client browser to generate an HTTP request that is transmitted as represented by arrow 108 to a server. For example, the HTTP request may represent a question as to the meaning of a particular acronym that is directed to a hosted web site on the server containing a database of acronyms. Line 110 represents processing of the received request by the server. In this example, the acronym web site will generate a query to its associated data base to locate the particular acronym. Upon the web site receiving a response to the query from the associated data base, a reply 112 is transmitted to the user's browser from the web site such as utilizing hypertext markup language (HTML)+cascading style sheet (CSS) data. The reply may contain the located definition of the requested particular acronym or an indication that such an acronym could not be located. An important aspect of this example is represented by the sequential nature of this series of communications. That is, for time T1 the user will typically be watching a screen display of an hourglass icon indicating that the client browser is awaiting an answer to the request. This is due to the normal web application model in which a reply to a request must be received (or a predetermined time out representing a reply failure) before the client browser application is made ready, i.e. released, to act on a further user input or to facilitate further processes. When the time T1 is substantial relative to an expected rate of screen image changes/refreshes, the user will likely be annoyed by the disruption.

Figure 4:
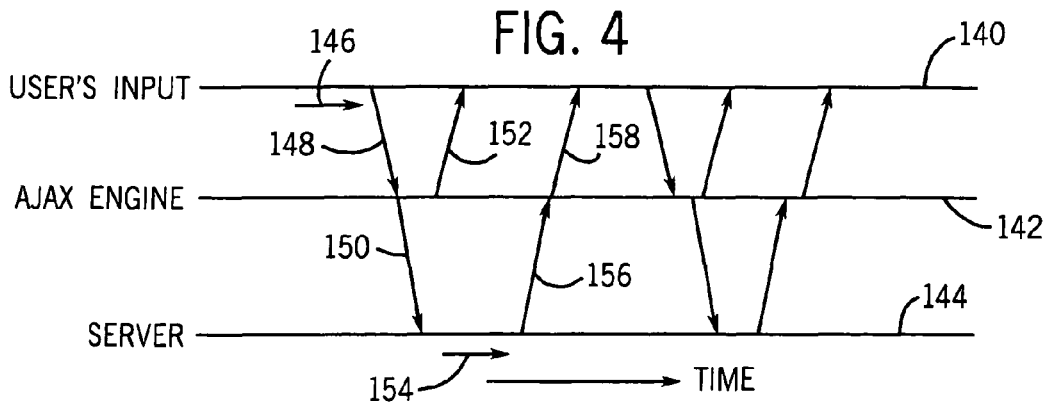
FIG. 4 is a signal flow diagram of client/server communications in accordance with an embodiment of the present invention.

FIG. 4 is a representative signal flow diagram of client-server communications in accordance with an embodiment of the present invention. The user input 140 and the server processing 144 of FIG. 4 correspond to the similar elements 100 and 102 of FIG. 3. However, FIG. 4 differs in that an AJAX engine represented by line 142 provides a signal flow interface between the user input 140 and the server 144. The name "AJAX" was created from Asynchronous JavaScript+XML (extensible markup language) and will be described in more detail below. The AJAX engine operates in conjunction with the user's browser at the client side of the server/client model. As indicated in the drawing, time is increasing from left to right.

In the following example a user input 146 is entered giving rise to a request for information from the server 144. A transmission 148 corresponding to this request is received by the AJAX engine 142 which also resides on the client side and operates in close cooperation with the user's browser from which the user input 146 originated. The transmission 148 may be a call of a JavaScript function already loaded in an html document. The AJAX engine generates and transmits a further request 150 to the server 144 seeking the information originally requested by input 146. The AJAX engine 142 may generate a response 152 that is received by the browser with very little time delay relative to a T1 time interval (e.g. less than 10% of time T1). The response 152 represents that the browser is free to proceed to receive further user input or execute further processes without the browser having to await a response originating from the server.

Upon receiving the request 150, the server processes the request and generates a reply utilizing appropriate resources during the time indicated by arrow 154. The server transmits the reply 156 that is received and processed by the AJAX engine 142 and forwarded as reply 158 to the browser 140. This completes the return of the requested information. It is important to recognize that the previously required sequential processing cycle, for a conventional browser request requiring an answer from the server before the client browser was released for further processing, is no longer required.

This permits the client browser to minimize time delays such that from the user's perspective, no delay or no significant delay is perceived. For example, in a gaming application where the client browser implements at least part of the game or a related game function and where data from the server is needed to determine an event such as whether the user has won a bonus in a multi-player gaming competition, in accordance with embodiments of the present invention, the user's screen does not become frozen while awaiting the information from the server. The user's screen can continue to show changing images depicting the ongoing play of the game with the bonus information being updated when it becomes available, i.e. on receipt of reply 158. Thus, only the relatively small time interval between the transmission of the user input 146 and the receipt of a reply 152, if required, will cause a delay, which due to the co-location of the AJAX engine with the client browser, will be small enough to be not noticeable to the user during the ongoing gaming, play.

FIG. 5 shows a functional block diagram illustrating the client/server communication model in accordance with embodiments of the present invention. A browser 200 running on the client computing apparatus includes a user interface 202 operating in conjunction with the AJAX engine 204. Communications between the browser 200 and server 208 are accomplished by the AJAX engine 204 using HTTP links 206. The server 208 is connected to various server support nodes 210 which may include a database and links to other information resources.

In the following example the user's computing apparatus utilizes browser 200 to implement and run at least a portion of a wagering game. During the ongoing play of the game a determination is to be made of whether the user has won a bonus as part of a multiple player gaming activity. Such a determination requires the receipt of information from the server. This example generally follows the signal flow diagram described and FIG. 4.

The user interface 202 generates a JavaScript call 220 representing the information request that is transmitted to the AJAX engine 204 by JavaScript. Since the request 220 is a JavaScript call, the user interface can proceed with further processing. Alternatively, with only a small time delay, e.g. less than 0.1 second, the AJAX engine 204 may transmit a Javascript reply 221 to the user interface 202 thereby permitting the user interface to continue processes relating to the ongoing game. A typical round trip information retrieval time is substantially longer than the time before the reply 221 is received by the browser, e.g. 10 times longer. Although the reply 221 does not contain a specific answer to the request 220 since the required information from the server has not yet been obtained, a relevant reply 221 or acknowledgement enables the ongoing game to continue without a delay to wait for the reply from the server. The AJAX engine 204 generates an asynchronous HTTP request 222 (XMLHttpRequest) transmitted by HTTP links 206 to the server 208. The server responds by generating a resource request 224 transmitted to the server support 210 seeking information sought by the request. The server support 210 generates a reply 226 received by server 208 where the reply 226 provides the answer to the user's request. It will be understood that the answer may comprise data sought by the request or may comprise an indication that such data is not available or could not be found. The server 208 transmits this information in an XML data reply 228 coupled by HTTP links 206 to the AJAX engine 204. The AJAX engine processes this reply and transmits the contained information as an HTML+CSS data signal 230 to the user interface 202. This completes the information cycle and provides information responsive to the initial request generated by the user interface 202.

The AJAX engine represents a combination of technologies. It incorporates a standards-based combination using XHTML and CSS; dynamic display and interaction using the document object model (DOM); data interchange and manipulation using XML and XSLT; asynchronous data retrieval using XMLHttpRequest; and JavaScript that integrates these technologies together. Applications which utilize the AJAX model include web based services such as Google's Gmail and Maps.

FIG. 6 is a signal flow diagram of an exemplary gaming application in which a user is permitted to engage in a wagering game hosted by a casino by utilizing a wireless computing apparatus. However, this is only permitted while the user stays within a defined geographic boundary, e.g. inside the casino building. Alternatively, the geographic boundary could be a state, county or city in which wagering is legal. In this example the boundary is the casino building. The four elements represented in this diagram are a client web browser 250 and a local AJAX engine 252 both on the user's wireless computing apparatus; a remote web server 254; and network services 256 that supports the web server.

In this example a wagering game as being played by a user on a PDA using a wireless link. The PDA periodically polls the web server to determine if its coordinates are within the permitted area for playing wagering games, e.g. inside the building of a casino. During the continuous ongoing play of the game, a background function running on the AJAX engine 252 monitors a timer that sets a predetermined time interval 260 in which the PDA has to be periodically validated as being within the permitted game playing area. Upon the timer indicating that a new validation is required, the AJAX engine 252 generates and transmits a validation request 262 to the remote web server 254. The web server 254 transmits the identity of the PDA and a request for its coordinates to network services 256 by a query 264. The network services 256 determine the coordinates of the PDA such as by radio triangulation or other known location techniques. Network services 256 generates and transmits a report 266 to the remote web server 254 identifying the particular PDA and providing its coordinates. The remote web server 254 then compares 268 the coordinates of the PDA with stored coordinates defining the permitted area for gaming.

In the illustrative example, the PDA had moved to a location outside the permitted area of play since the last validation. The remote web server 254 saves the user's state of the play of the game at step 270. Remote web server 254 transmits a signal 272 to the local AJAX engine 252 indicating that the current PDA coordinates are invalid. This causes the AJAX engine 252 to generate and transmit a message 274 to the co-resident client web browser 250 causing an "Out Of Permitted Playing Area" notice to be displayed on the screen of the PDA to the user. If the user returns to a permitted location, the game will be reinstated utilizing the saved game states for the user upon the periodic validation determining that the PDA is within a permitted gaming area. Alternatively, if the PDA has remained within a permitted playing area, signal 272 will contain a valid coordinate signal which will be recognized by the AJAX engine 252 as indicating that the ongoing play of the game is permitted to continue until the next coordinate validation check. This example illustrates that a client browser in association with an AJAX engine can permit the ongoing play of a game without causing a disruption of the user due to the delay in obtaining information related to the play the game from a remote server.

FIG. 7 illustrates another example in which a mobile device such as a PDA permits a user ongoing play a game while periodically polling a web server to determine in an hourly or daily special prize has been won by the user. The AJAX engine 252 monitors of a timer at step 280 to determine if it is time to inquire if a special prize has been won by the user. Special hourly or daily prizes may be awarded at random times within the set time interval to users who are currently engaged in gaming as a further incentive to continue playing. Upon the timer indicating that it is time to check on the status of the special prize, the AJAX engine 252 transmits a query 282 to the remote web server 254 to determine if the subject user has won the special prize. Upon receiving this request, the web server 254 generates a further query 284 to a network service 256 providing a special prize service. Utilizing any of a variety of random or pseudorandom determination functions, the service 256 will determine whether the user associated with the identified PDA has won the special prize in the subject time interval. In this example, a determination is made that the user associated with the identified PDA has won the special prize. A reply 286 reporting that the user has won the special prize is transmitted from the service 256 to the web server 254. In turn, the web server 254 transmits a "prize has been won" message 288 to the AJAX engine 252. Upon receiving this information, the AJAX engine 252 generates a control message 290 that is transmitted to the web browser 250 cause it to display a message to the user indicating that the special prize has been won. It will be noted that all of the above-described actions and messages prior to the display on the user's screen of the special prize won message has occurred without any disruption or delay in the ongoing play of the game by the user.

FIG. 8 illustrates another example in which a mobile device such as a PDA permits a user ongoing play a game while a participating in a bonus prize opportunity in which a web server determines if the bonus prize has been won by the user. The user plays another game on his PDA using a credit. The playing of the game using a credit is reported by step 291 to the AJAX engine 252. The AJAX engine 252 in turn activates bonus image viewing at step 292 by sending information causing the PDA screen to display the bonus images to the user at step 293. The AJAX engine 252 transmits a query 294 to the remote web server 254 to determine if the subject user has won the bonus prize. Upon receiving this request, the web server 254 generates a further query 295 to a network service 256 providing a bonus prize service. Utilizing any of a variety of random or pseudorandom determination functions, the service 256 will determine whether the user associated with the identified PDA has won the bonus prize in the subject time interval. In this example, a determination is made that the user associated with the identified PDA has won the bonus prize. A reply 296 reporting that the user has won the bonus prize is transmitted from the service 256 to the web server 254. In turn, the web server 254 transmits a bonus win results message 297 to the AJAX engine 252. Upon receiving this information, the AJAX engine 252 generates bonus outcome image to be displayed at step 298 and transmits a control message 299 to the web browser 250 causing the bonus win outcome image to be displayed to the user indicating that the bonus prize has been won. It will be noted that all of the above-described actions and messages prior to the display on the user's screen of the bonus prize won image has occurred without any disruption or delay in the ongoing play of the game by the user.

FIG. 9 illustrates an exemplary method in accordance with an embodiment of the present invention of actions taken by a client computing apparatus when information is to be sought from a remote server. In step 300 a user is engaged with the play of an ongoing gaming application at the client computing apparatus. In step 302 the AJAX engine receives an input from the gaming application that requires information to be received by a reply from a server. In step 304 the AJAX engine generates and sends an asynchronous query to the server seeking the required information. In step 306, the AJAX engine continues to service the ongoing user gaming application associated with the browser prior to the receipt of a reply from the server in response to the request. In one implementation, the browser running the gaming application uses a JavaScript call to convey the request to the AJAX engine. In an alternate implementation the AJAX engine will transmit an appropriate message to the browser as soon as possible after having received the input from the application requiring a reply from the server. This appropriate message is meant to satisfy the requirement of the browser so that the browser can continue its processes without having to wait for the reply message from the server. With the illustrative task having been completed, the steps terminate at END 308.

FIG. 10 illustrates an exemplary method in accordance with an embodiment of the present invention of actions taken by a client computing apparatus upon the receipt of a reply from a remote server. In step 320 the AJAX engine receives an asynchronous reply from the remote server to a previously transmitted query by the AJAX engine. This reply is processed at step 322 by the AJAX engine and transmitted as an HTML+CSS data to be associated browser. This action completes the question/answer cycle initiated by the browser. This exemplary task terminates at END 324.

The AJAX engine/technology is merely representative of one embodiment of various types of intermediate client-side processing (ICSP) engines used in cooperation with a browser that permits asynchronous replies to be received from a server by the browser without the user having to endure a wait state while the browser awaits the receipt of the reply from the server. For example, a different ICSP engine, ATLAS, is proposed by Microsoft Corporation.

The computing apparatus in one example employs one or more computer readable signal bearing media. The computer-readable signal-bearing media store software, firmware and/or assembly language for performing one or more portions of one or more embodiments of the invention. The computer-readable signal-bearing medium for the computing apparatus in one example comprises one or more of a magnetic, electrical, optical, biological, and atomic data storage medium. For example, the computer-readable signal-bearing medium may comprise floppy disks, magnetic tapes, CD-ROMs, DVD-ROMs, hard disk drives, USB flash memory and electronic memory modules. In another example, the computer-readable signal-bearing medium comprises a modulated carrier signal or digital baseband signal transmitted over a network coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Each of these embodiments and obvious variations thereof is contemplated as falling within the spirit and scope of the claimed invention, which is set forth in the following claims.

What is claimed is:

1. A communication method implemented by a portable computing apparatus operating as a gaming machine that permits wagering on games comprising the steps of:
   receiving a first input from a browser residing on the portable computing apparatus by an intermediate client-side processing, ICSP, engine also residing on the computing apparatus, where the first input is a request for information of the physical location of the computing apparatus relative to a predetermined boundary within which the portable computing apparatus must be in order to be operated as a gaming machine that permits wagering on games;
   generating a first message by the ICSP engine responsive to receipt of the first input and transmitting the first message to the remote server, where the first message seeks said information from a remote server;
   releasing the browser to process other actions following the sending of the first input to the ICSP engine without having yet received a reply to the first input;
   receiving, in response to said first message, an other message by the ICSP engine from the remote server, where the other message conveys to the portable computing apparatus whether it is within said predetermined boundary, where the computing apparatus communicates the first message to and receives the other message from the remote server by wireless communication channels;
   linking the browser to the ICSP engine by a first HTTP link;
   wirelessly linking the ICSP engine to the remote server via the wireless communication channels by a second HTTP link;
   responsive to the portable computing apparatus being within the predetermined boundary, displaying in the browser at least a portion of a wagering game on a display of the portable computing apparatus; and
   during ongoing play of the wagering game on the portable computing apparatus, the ICSP engine monitoring a timer defining a time interval in which the portable computing apparatus is to be periodically validated as being within the predetermined boundary, wherein the releasing the browser to process other actions includes the browser displaying changing images of the wagering game on the portable computing apparatus at least until the reply to the first input is received.

2. The communication method of claim 1 wherein the first message comprises an asynchronous data retrieval message.

3. The communication method of claim 2 wherein the asynchronous data retrieval message comprises an extensible markup language hypertext transfer protocol request (XMLHttpRequest).

4. The communication method of claim 1 further comprising:
   generating a second message by the ICSP engine responsive to receipt of the first input and transmitting the second message to the browser without awaiting receipt of a reply responding to the first message from the remote server;
   receiving the second message by the browser enables the browser to continue processing other tasks without having received the reply from the remote server responding to the request by the browser;
   receiving a third message originated by the remote server by the ICSP engine, the third message being a reply to the first message.

5. The communication method of claim 1 further comprising the step of displaying boundary information to the user in response to receipt of the other message so that the user is advised of whether the portable computing apparatus is permitted to operate as a gaming machine that permits wagering on games at its current location.

6. The communication method of claim 4 further comprising the step of converting by the ICSP engine the XML data of the third message into a fourth message that is transmitted to the browser.

7. The communication method of claim 6 wherein the fourth message comprises hypertext markup language, HTML, format and cascading style sheet, CSS, data.

8. The communication method of claim 6 wherein a first time interval from the receiving of the first input by the ICSP engine to receipt of the third message by the ICSP engine is substantially longer than a second time interval from the receiving of the first input by the ICSP engine to transmission of the second message by the ICSP engine.

9. The communication method of claim 1 further comprising the step of the remote server saving states associated with the ongoing play of a game by the user upon a determination being made that the portable computing apparatus is not within said predetermined boundary so that play of the game interrupted due to the computing apparatus being outside of the predetermined boundary can be resumed by restarting the game with said saved states when the computing apparatus is inside of the predetermined boundary.

10. A portable computing apparatus operating as a gaming machine that permits wagering on games, the computing apparatus comprising:
    a browser adapted to generate a first message representing a request for information contained on a remote server;
    an intermediate client-side processing, ICSP, engine coupled with the browser by a first HTTP link and adapted to receive the first message, the browser transmitting the first message to the ICSP engine where the first message is a request for information of the physical location of the computing apparatus relative to a predetermined boundary within which the portable computing apparatus must be in order to be operated as a gaming machine that permits wagering on games;
    the ICSP engine generating a second message in response to receipt of the first message and transmitting the second message to the remote server, where the second message seeks said information from the remote server;

the browser, following the transmission of the first message, being released to process other actions without having yet received a reply to the first message;

the ICSP engine receiving, in response to said second message, an other message from the remote server, where the other message conveys to the portable computing apparatus whether it is within said predetermined boundary;

a wireless communication access module communicates the second message to and receives the other message from the remote server by wireless communication channels channels by a second HTTP link;

a display that displays in the browser at least a portion of a wagering game responsive to the computing apparatus being within the predetermined boundary; and a timer monitored by the ICSP, the timer defining a time interval in which the computing apparatus is to be periodically validated as being within the predetermined boundary during ongoing play of the wagering game on the computing apparatus, wherein the other actions includes displaying on the display in the browser changing images of the wagering game at least until the reply to the first message is received.

11. The computing apparatus of claim 10 wherein the second message generated by the ICSP engine comprises an asynchronous data retrieval message.

12. The computing apparatus of claim 11 wherein the asynchronous data retrieval message comprises an extensible markup language hypertext transfer protocol request (XMLHttpRequest).

13. The computing apparatus of claim 10 further comprising:

the ICSP engine generating a third message in response to receipt of the first message and transmitting the third message to the browser without awaiting receipt of a reply from the remote server responding to the second message;

the browser receiving the third message that enables the browser to continue processing other tasks without having received the reply from the remote server responding to the request by the browser;

the ICSP engine receiving a fourth message originated by the remote server, the fourth message being a reply to the second message.

14. The computing apparatus of claim 10 further comprising means for displaying boundary information to the user in response to receipt of the other message so that the user is advised of whether the portable computing apparatus is permitted to operate as a gaming machine that permits wagering on games at its current location.

15. The computing apparatus of claim 13 further comprising the ICSP engine converting the XML data of the fourth message into a fifth message that is transmitted to the browser.

16. The computing apparatus of claim 15 wherein the fifth message comprises hypertext markup language, HTML, format and cascading style sheet, CSS, data.

17. The computing apparatus of claim 15 wherein a first time interval from the receiving of the first message by the ICSP engine to receipt of the fourth message by the ICSP engine is substantially longer than a second time interval from the receiving of the first message by the ICSP engine to transmission of the third message by the ICSP engine.

18. The computing apparatus of claim 10 wherein the remote server stores states associated with the ongoing play of a game by the user upon a determination being made that the portable computing apparatus is not within said predetermined boundary so that play of a game interrupted due to the computing apparatus being outside of the predetermined boundary can be resumed by restarting the game with said stored states when the computing apparatus is inside of the predetermined boundary.

19. A communication method implemented by a computing apparatus operating as a gaming machine that permits wagering on games comprising the steps of:

receiving a first input from a browser residing on the computing apparatus by an intermediate client-side processing, ICSP, engine also residing on the computing apparatus, where the first input is a request for information of whether a special prize has been awarded to the user based on play of a game;

generating a first message by the ICSP engine responsive to receipt of the first input and transmitting the first message to the remote server, where the first message seeks said information from a remote server, the special prize information being accessible to the remote server from a special prize service server;

releasing the browser to process other actions following the sending of the first input to the ICSP engine without having yet received a reply to the first input;

receiving, in response to said first message, an other message by the ICSP engine from the remote server, where the other message conveys to the computing apparatus whether a special prize has been awarded;

linking the browser to the ICSP engine by a first HTTP link;

linking the ICSP engine to the remote server by a second HTTP link; and during ongoing play of the game on the computing apparatus, the ICSP engine monitoring a timer defining a time interval in which the computing apparatus is to be periodically validated as being within a predetermined boundary within which the computing apparatus must be in order to be operated as a gaming machine that permits wagering on games, wherein the releasing the browser to process other actions includes the browser displaying on the computing apparatus changing images of at least a portion of a wagering game on the computing apparatus at least until the reply to the first input is received.

20. A computing apparatus operating as a gaming machine that permits wagering on games, the computing apparatus comprising:

a browser adapted to generate a first message representing a request for information contained on a remote server;

an intermediate client-side processing, ICSP, engine coupled with the browser by a first HTTP link and adapted to receive the first message, the browser transmitting the first message to the ICSP engine where the first message is a request for information of whether a special prize has been awarded to the user based on play of a game;

the ICSP engine generating a second message in response to receipt of the first message and transmitting the second message to the remote server by a second HTTP link, the ICSP engine being wirelessly coupled to the remote server, where the second message seeks said information from the remote server, the special prize information being accessible to the remote server from a special prize service server;

the browser, following the transmission of the first message, being released to process other actions without having yet received a reply to the first message;

the ICSP engine receiving, in response to said second message, an other message from the remote server, where the other message conveys to the computing apparatus whether a special prize has been awarded to the user based on play of a game;

a display that displays in the browser at least a portion of a wagering game responsive to the computing apparatus being within a predetermined boundary within which the computing apparatus must be in order to be operated as a gaming machine that permits wagering on games; and a timer monitored by the ICSP, the timer defining a time interval in which the computing apparatus is to be periodically validated as being within the predetermined boundary during ongoing play of the wagering game on the computing apparatus, wherein the other actions includes displaying on the display in the browser changing images of the wagering game at least until the reply to the first message is received.

21. The communication method of claim 1, further comprising the steps of:

receiving a second input from the browser, the second input being a request for information of whether a prize or a bonus has been awarded to a user of the portable computing apparatus based on play of the wagering game;

generating a second message by the ICSP engine responsive to receipt of the second input and transmitting the second message to the remote server, where the second message seeks the information from the remote server;

releasing the browser to process other actions relating to the wagering game following the sending of the second input to the ICSP engine without having yet received a reply to the second input; and receiving, in response to the second message, a further message by the ICSP engine from the remote server, where the further message conveys to the computing apparatus whether the prize or the bonus has been awarded.

22. The communication method of claim 1, further comprising the step of the remote server saving states associated with the ongoing play of a game by the user upon a determination being made that the portable computing apparatus is not within said predetermined boundary so that play of the game interrupted due to the computing apparatus being outside of the predetermined boundary can be resumed by restarting the game with said saved states when the computing apparatus is inside of the predetermined boundary.

23. The portable computing apparatus of claim 10, further comprising:

the browser receiving an input corresponding to a request for information of whether a prize or a bonus has been awarded to a user of the portable computing apparatus based on play of the wagering game;

the ICSP engine generating a third message responsive to receipt of the input and transmitting the third message to the remote server, where the third message seeks information from the remote server;

the browser being released to process other actions relating to the wagering game following the receipt of the input without having yet received a reply to the input; and the ICSP engine receiving, in response to the third message, a further message from the remote server, where the further message conveys to the portable computing apparatus whether the prize or the bonus has been awarded.

* * * * *